United States Patent [19]

Petrossian et al.

[11] Patent Number: 5,027,200

[45] Date of Patent: * Jun. 25, 1991

[54] ENHANCED VIEWING AT SIDE AND REAR OF MOTOR VEHICLES

[76] Inventors: Edward Petrossian; Ashkhen A. Petrossian, both of 1140 Elm Ave., Apt. 111, Glendale, Calif. 91201

[*] Notice: The portion of the term of this patent subsequent to Mar. 20, 2007 has been disclaimed.

[21] Appl. No.: 550,556

[22] Filed: Jul. 10, 1990

[51] Int. Cl.$^5$ .............................................. H04N 7/18
[52] U.S. Cl. ................... 358/103; 358/108; 358/229; 354/81; 354/293
[58] Field of Search ........ 358/103, 108, 229; 354/81, 293

[56] References Cited

U.S. PATENT DOCUMENTS

| | | |
|---|---|---|
| 3,176,602 | 4/1965 | Wilt . |
| 3,689,695 | 9/1972 | Rosenfield et al. . |
| 4,029,246 | 6/1977 | Woodruff . |
| 4,093,364 | 6/1978 | Miller . |
| 4,214,266 | 7/1980 | Myers . |
| 4,277,804 | 7/1981 | Robison . |
| 4,383,626 | 5/1983 | Weinblatt . |
| 4,420,238 | 12/1983 | Felix . |
| 4,615,597 | 10/1986 | Burriss . |
| 4,635,110 | 1/1987 | Weinblatt . |
| 4,910,591 | 3/1990 | Petrossian et al. .................. 358/103 |

FOREIGN PATENT DOCUMENTS

| | | | |
|---|---|---|---|
| 0209635 | 12/1983 | Japan .................................. 358/108 |
| 0934037 | 9/1958 | United Kingdom ................ 358/108 |

Primary Examiner—Howard W. Britton
Assistant Examiner—Michael H. Lee
Attorney, Agent, or Firm—William W. Haefliger

[57] ABSTRACT

Apparatus permits viewing of traffic or other conditions to the rear and side of a motor vehicle having opposite sides, and includes video camera structure mounted to the vehicle and directed sidewardly relative to the vehicle, and CRT structure operatively connected to the camera structure to display the camera output on a CRT screen zone or zones, to be viewed by the driver, and ehancement means is associated with the video camera structure to enhance viewing or scanning thereof, to the rear and side of the vehicle.

11 Claims, 5 Drawing Sheets

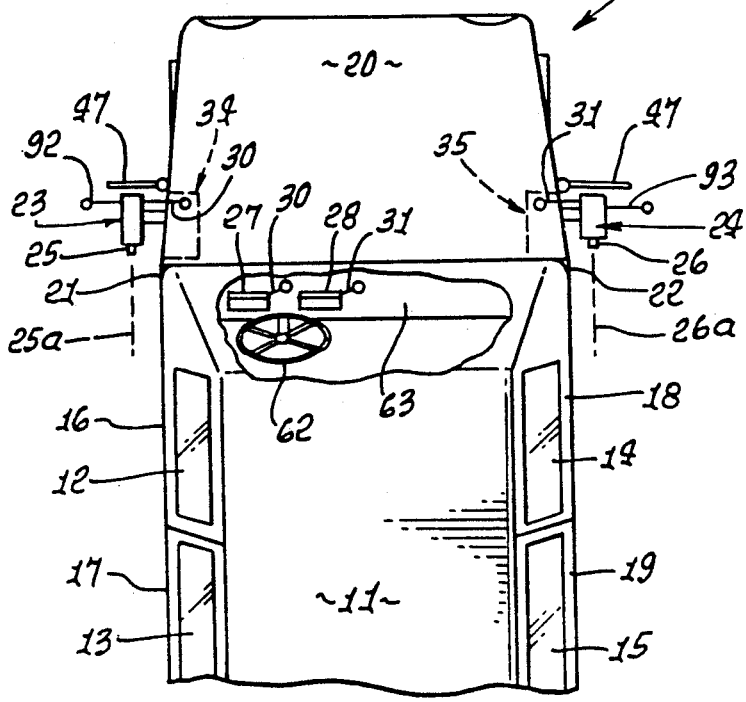
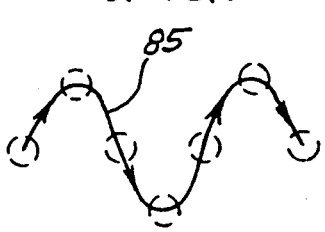
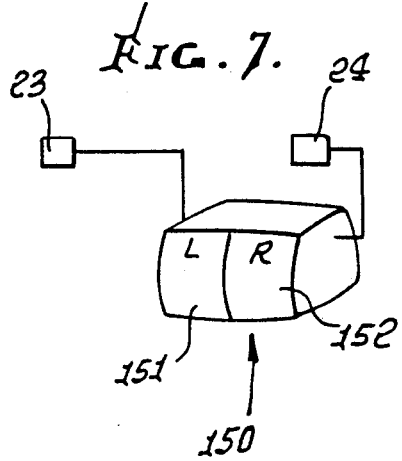
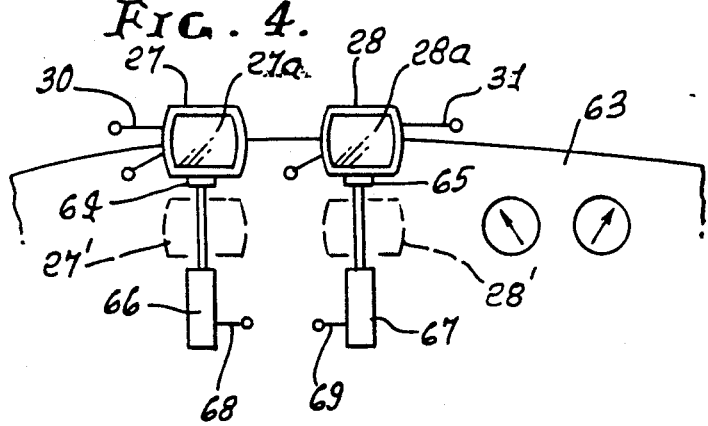
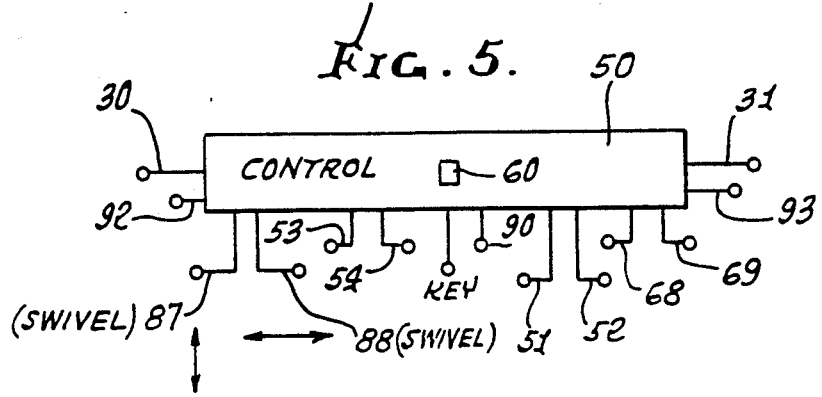

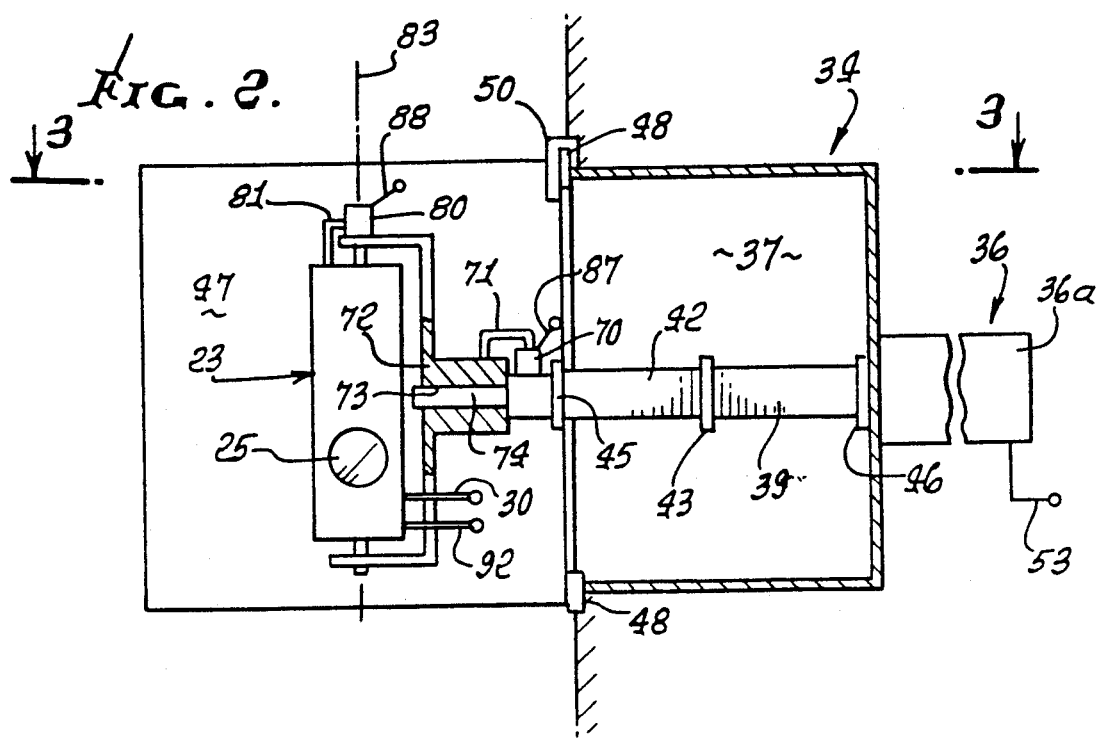
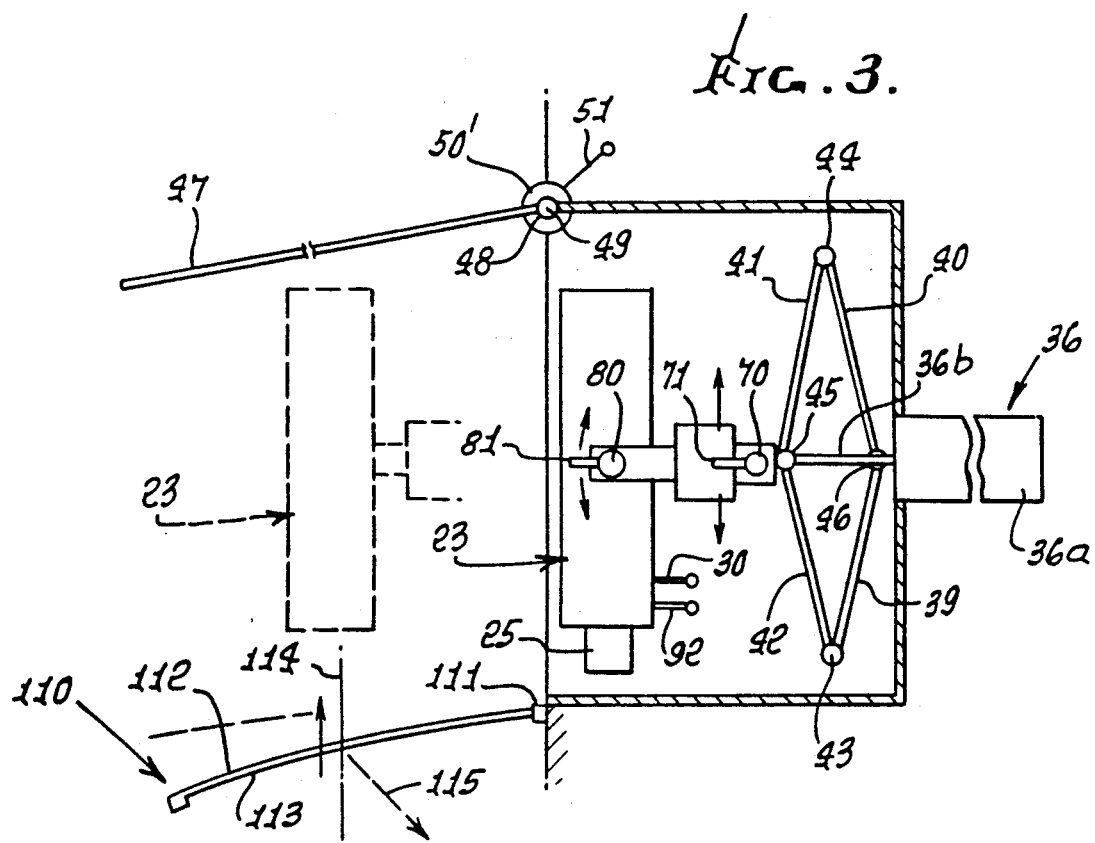

ENHANCED VIEWING AT SIDE AND REAR OF MOTOR VEHICLES

BACKGROUND OF THE INVENTION

This invention relates generally to rearward from vehicles, such as trucks, autos, etc.; more particularly it concerns viewing of traffic conditions to the rear of and at both sides of such vehicles.

As stated in our prior U.S. Pat. No. 4,910,591, there presently exists need for the following:

A. Elimination of need for the driver of the motor vehicle to turn his head left or right while changing lanes in order to spot vehicles on either side which would otherwise be invisible;

B. Elimination of need for the driver to turn his head left or right while changing lanes, so that the driver can concentrate and observe vehicles ahead, to thereby eliminate the risk of colliding with the vehicle ahead;

C. Need for enhanced comfort in driving, with knowledge of nearby traffic;

D. Need for constant driver awareness of vehicles driving on either side of his vehicle;

E. Need to make driving for the elderly and the handicapped easier, more comfortable and less cumbersome;

F. Need for two or three different type mirrors on either side of vehicles to be eliminated. Such mirrors are curved differently and drivers have difficulty in visually adjusting to them.

G. Need to supplement information provided by mirrors on either side of the vehicles;

H. Need to make accurate evaluation of distances of other vehicles on either side of the driver, using miniature T.V. screens, as opposed to the present distorted and inaccurate distance reflected on concave or convex mirrors;

I. Need to reduce risk of accidents.

There is also need to simultaneously view different zones at the same side of the vehicle; to view blind spots as well as other conditions to the rear and side of the vehicle; to view over short intervals the same zones at the rear and side of the vehicle; and to view zones to the rear of truck trailer units, as well as to the rear of truck-tractor units.

SUMMARY OF THE INVENTION

It is a major object of the invention to provide apparatus meeting the above enhancement needs. Basically, the apparatus permits clear viewing of traffic conditions to the rear and side of the vehicle, without distortions as are introduced by wide angle mirrors. The apparatus comprises, basically, the following:

a) video camera means mounted to the vehicle and directed sidewardly relative to the vehicle, and CRT means operatively connected to the camera means to display the camera means output on CRT screen means, to be viewed by the driver, b) enhancement means associated with said video camera means to enhance viewing thereof to the rear and side of the vehicle.

It is another object of the invention to provide video camera means in the form of a first video camera at one side of the vehicle and operatively connected with a first screen portion of said CRT means, and enhancement means in the form of a second video camera means at said one side of the vehicle, and operatively connected with a second screen portion of said CRT means, the first and second video cameras directed to view different zones at the side and rear of the vehicle relative to the one side of the vehicle. As will be seen, the first video camera may be directed in a first direction to view a first zone rearwardly of said one side of the vehicle, and the second video camera directed in a second direction to view a second zone rearwardly and sidewardly spaced from said one side of the vehicle.

It is a further object of the invention to provide the video camera means to include a first video camera at one side of the vehicle, and operatively connected with first and second screen portions of the CRT means, the enhancement means comprising viewing control means associated with the first camera whereby during first time intervals the first camera views a first zone rearwardly of said one side of the vehicle, for display at said first screen portion, and during second time intervals the first camera views a second zone rearwardly and sidewardly spaced from said one side of the vehicle.

Yet another object includes means for effecting swiveling of the camera means, and wherein the enhancement means includes:

i) a manually selectable dwell selector associated with the CRT means, and ii) control means connected with the dwell selector and with the means for effecting swiveling of said camera means, for stopping camera swiveling during a dwell interval.

Indicator means may be associated with the CRT means and operatively connected with said control means, for quickly and positively indicating to the driver the swivel stopped condition of the camera means. The indicator means may comprise a visual ON-OFF indicator element proximate the CRT means, and which remains "OFF" during said swivel stopped condition of the camera means. A manually operable control may be provided to stop camera swiveling in a selected position.

Another object is to provide enhancement means which includes dwell circuitry connected with the swiveling means to automatically effect stopping of camera means swiveling, during a predetermined dwell interval.

The circuitry may include microprocessor means to effect said dwell when the video camera means is directed toward a blind spot zone, or other zone relative to the driver.

Finally, where the vehicle comprises a tractor-trailer, the enhancement means may comprise additional video camera means on the trailer operatively connected to said CRT means, which is in said tractor to be viewed by the driver, the additional video camera means directed toward the rear and side of the trailer to enable the driver to see on said CRT means roadway conditions to the rear and side of the trailer as well as to the rear and side of the tractor, as during back-up, and jack-knifing during back-up.

These and other objects and advantages of the invention, as well as the details of an illustrative embodiment, will be more fully understood from the following specification and drawings, in which:

DRAWING DESCRIPTION

FIG. 1 is a top plan view of a vehicle incorporating the disclosed system;

FIG. 2 is an enlarged elevation, looking forwardly, showing mounting of a video camera;

FIG. 3 is a top plan view taken on lines 3—3 of FIG. 2

FIG. 4 is an elevation showing mounting of CRT screens;

FIG. 5 is a block diagram showing a control system;

FIG. 6 shows a swivel path of the camera lens;

FIG. 7 shows a modified CRT arrangement;

DETAILED DESCRIPTION

Figure 8:
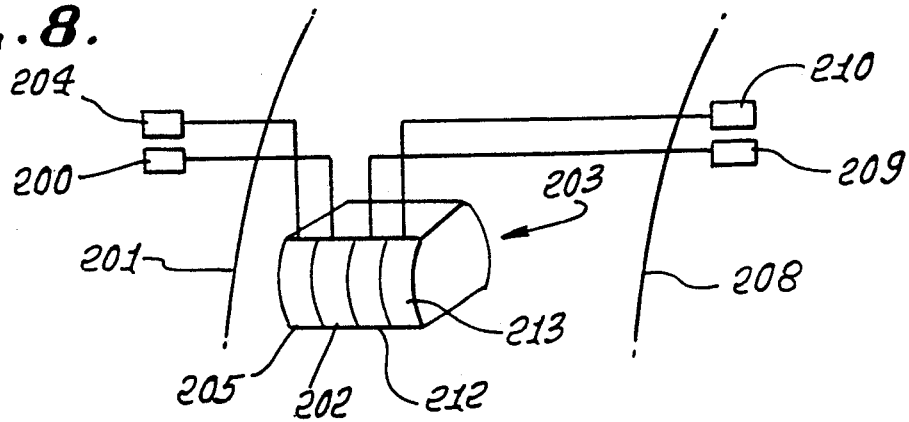
FIG. 8 is a circuit diagram.

As referred to in FIG. 1 of U.S. Pat. No. 4,910,591, a vehicle 10 such as a passenger has a top or roof 11, left and right side windows 12–15 on doors 16–19, an engine hood 20, and body side walls 21 and 22 forward of the front doors. First and second video cameras 23 and 24 are provided at the left and right sides of the vehicle and are mounted with their lenses or lens openings 25 and 26 facing generally rearwardly to scan traffic and other conditions at the vehicle rear. Note the rearward direction of viewing indicated by broken lines 25a and 26a. First an second video display terminals 27 and 28, with video screens 27a and 28a, are respectively connected with the cameras, as by leads indicated at 30 and 31 to display the areas viewed by the video cameras.

First and second means are provided to mount the cameras to the vehicle at the respective opposite sides 21 and 22 thereof, for example. The cameras are to be mounted relatively lower on a truck body, and relatively higher on a passenger vehicle body. The mounting means are generally indicated at 34 and 35, and are to provide for swiveling of the cameras, side to side if the cameras are mounted on a passenger car, and both side to side, and up and down if mounted on a truck chassis, which stands generally higher than an auto body.

FIGS. 2 and 3 show one such mounting means 34 for the left side (the right side being the same). The mounting means 34 includes an actuator 36 operatively connected with the camera 23 to move it horizontally, away from the side 20 of the vehicle, i.e. from retracted position in a well 37 in the vehicle body as seen in FIG. 3, to an extended position outwardly of the well, as seen in FIG. 2. The actuator includes a drive 36a, and an extensible link 36b movable leftwardly and rightwardly by the drive. For this purpose, the camera may be carried by a parallelogram linkage including links 39–42, hinged at 43–46, as seen in FIG. 2. The linkage holds the camera body 23 oriented in the same neutral (unswiveled) position as it extends and retracts, the hinges allowing link pivoting about vertical axes.

A protective door 47 is hinged at 48 to the auto body, to swing about a vertical axis 49, and a drive 50' on the auto body rotates the door open and closed (locked) as controlled by master control 50 seen in FIG. 5. Note connections 51 and 52 from 50 to the door drives 50'. When closed, the doors cover the entrances to the wells 37, and protect (lock) the retracted cameras in the wells. The acutator drives 36a are connected at 53 and 54 with the master control 50. The connections are such that when the vehicle operator turns his ignition key "ON" and also turns a control switch 60 "ON", the control 50 is energized by the vehicle battery and causes the door 47 to open, and the cameras then are bodily extended from the vehicle body, as into FIG. 2 position, by operation of the door drives and camera mount actuators 36. Other equivalent structures may be provided for these purposes. In door closed position, the doors may be flush with the opposite sides of the vehicle. If switch 60 is not turned to "ON" position, the cameras are not deployed, as described (as during bad weather or during idling).

The screens display the scenes or views, as "viewed" by the cameras, existent at the rear of the vehicle and at both sides thereof. The screens are shown at locations in front of the driver, i.e. to the front of the steering wheel 62. For this purpose the terminals may be mounted on, near, or in association with dash board 63. The terminals are mounted as by third and fourth mounting means indicated at 64 and 65. Actuators 66 and 67 may be provided to move the mounting means 64 and 65 and terminals up and down, as between lowered positions seen at 27' and 28', to full line positions 27 and 28, in FIG. 4. Thus, when switch 60 is turned "ON", the actuators are energized by the control 50 to elevate or deploy the screens to raised position. See connections at 68 and 69 from the actuators to the control 50.

At least one of the first and second mounting means (and preferably both) for the cameras include swiveling means to swivel one or both cameras in at least one of the following modes:

i) up and down ii) side to side as during camera operation, whereby a full, wide and complete view of road conditions to the rear of the vehicle is realized. See for this purpose "up-down" swivel actuator 70 connected at 71 to the camera gimble 72, swiveled at 73 to a horizontal stub axle 74 on linkage 39–42, to swivel the gimble and the camera 23 about a horizontal axis. Actuator 70 is mounted on the linkage. See also side-to-side swivel actuator 80 mounted on gimble 72 and connected at 81 to the camera to rotate at about vertical axis 83 defined by the gimble. The actuators 70 and 80 are controlled by control 50 to swivel camera up and down and from side to side. See for example FIG. 6 showing the camera lens 25 moved along a sinusoidal path 85 during up and down, and side to side slewing, the lens moving from left to right in FIG. 6, and then moved back to the left along the same path. See connections 87 and 88 between the drives 70 and 80 and the control. Such slewing control is programmed into the master control. For passenger vehicles, the programming may be such as to only swivel the camera side to side, i.e. omitting up-down swivel.

Ignition key circuit connection to control 50 is seen at 90, in FIG. 5.

The cameras and CRT's themselves are also energized, automatically and electrically, when switch 60 is turned "ON", as via leads 92 and 93.

FIG. 2 also shows an auxiliary rear view mirror 11? mounted at 111 at the side of the vehicle. The body 112 of the mirror is metallized as at 113 so as to pass light through the mirror (see ray 114) to the camera, and also to reflect light (see ray 115) toward the driver. Thus, the mirror permits the driver to observe conditions at the vehicle rear, in the normal manner, when the video camera is not operating; yet it does not obstruct or interfere with camera operation. Therefore, what the mirror "sees" is what the camera sees, in one camera position. The mirror is pivotable at 111. The use of the mirror is optional.

It should be noted that the camera and CRT's can be connected to the engine ignition so as to be switched on and off, as the ignition is switched on and off.

The cameras need not be retracted into housings in the vehicle body, but can be (as described above) if required for any application, if cost justifies. Camera swiveling up and down is primarily for large or heavy vehicles, such as trucks, buses, semi-trailers, etc. For passenger cars, only one camera and screen is an option. The cameras can optionally be mounted to or in the forward fender areas of the vehicle. Cameras could also be mounted on or in conjunction with the mirror or mirrors.

FIG. 7 shows a modified CRT arrangement, using one CRT 150 with two screen sections 151 and 152, i.e. left "L" and right "R" sections. The left and right video cameras 23 and 24 are connected to the one CRT 150, and the latter's circuitry operates to portray the camera transmitted views onto screen sections 151 and 152.

The improvement of the present invention has to do with the provision of:

a) video camera means mounted to the vehicle and directed sidewardly relative to the vehicle, and CRT means operatively connected to the camera means to display the camera means output on CRT screen means, to be viewed by the driver, and b) enhancement means associated with said video camera means to enhance viewing thereof to the rear and side of the vehicle.

In the embodiment seen schematically in FIG. 8, the video camera means includes a first video camera 200 at one side 201 of the vehicle and operatively connected with a first screen portion 202 of CRT means 203 in the vehicle, facing the driver. The enhancement means comprises a second video camera 204 at that one side 201 of the vehicle, and operatively connected with a second screen portion 205 of the CRT means 203. The first and second video cameras are typically directed to view different zones 206 and 207 at the rear, and at the rear and side, respectively, of the vehicle relative to that one side of the vehicle. Examples of zones 206 and 207 appear in FIG. 9. The video camera may be as described above at 23.

Figure 9:
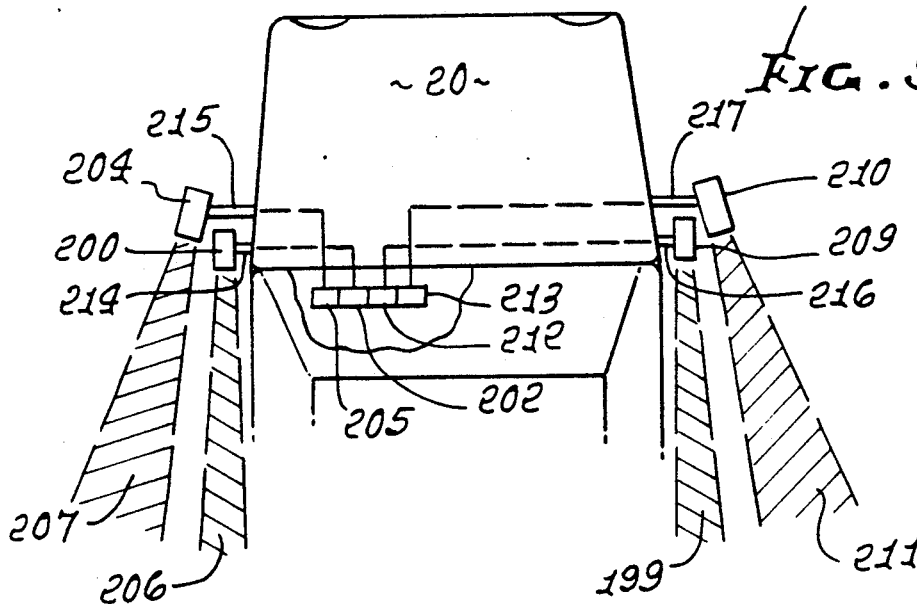
FIG. 9 is a plan view like FIG. 1.

At the opposite side 208 of the vehicle, another video camera 209 is provided, like camera 200, to view zone 199 rearwardly of the vehicle. An enhancement video camera 210 like camera 204, is provided and scans zone 211 rearwardly and sidewardly of the vehicle. Cameras 209 and 210 are operatively connected with CRT screen portions 212 and 213, as seen in FIGS. 8 and 9. Structure 214-217 connects the cameras to the vehicle sides, in any of the ways described above. Zones 207 and 211 may encompass "blind spot" areas at the rear and are spaced laterally from the vehicle. The cameras 204 and 202 are also directed in two different directions (angularly spaced); and cameras 209 and 210 are also directed in two different directions (angularly spaced).

Figure 10:
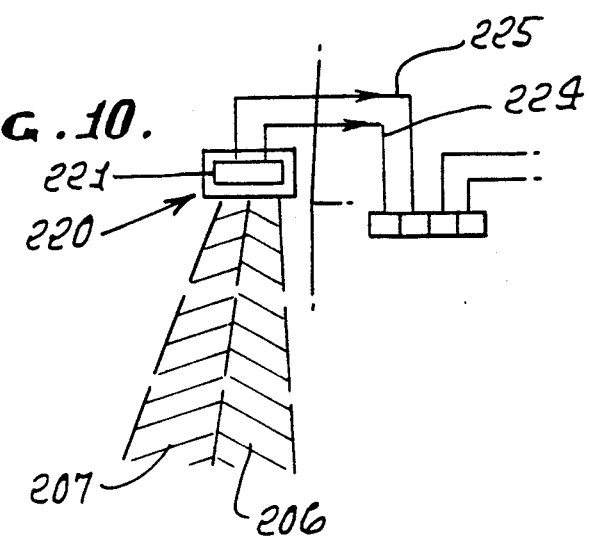
FIG. 10 is a schematic showing of one camera for viewing dual zones.
Figure 11:
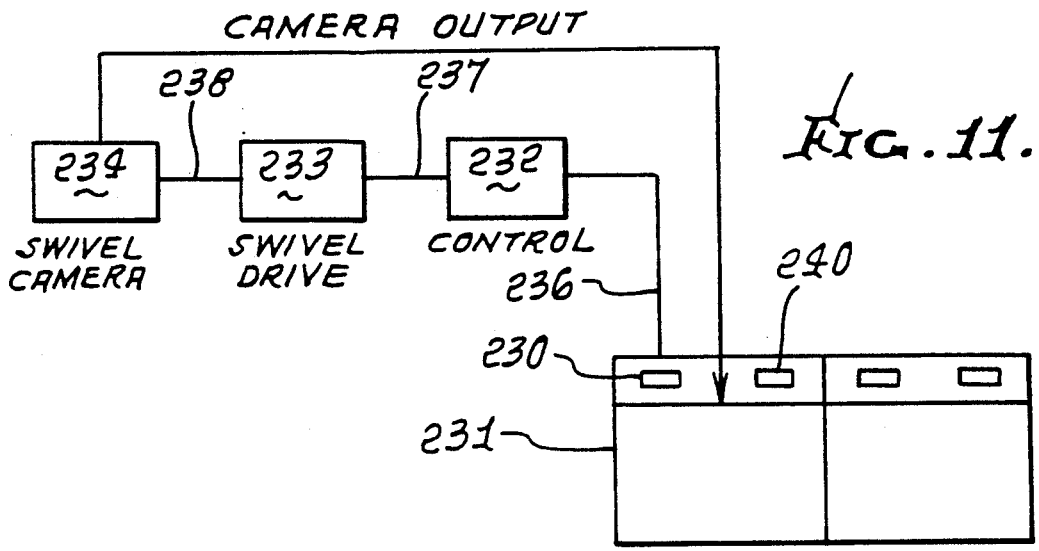
FIG. 11 is a circuit diagram (swivel dwell)

In FIG. 10, a single camera 220 takes the place of both cameras 202 and 204, for example, and their functions. Thus, output of camera 220 is connected with both screen portions 202 and 205, and the enhancement means comprises viewing control means 221 (circuitry, for example) associated with camera 220, whereby during first time intervals the single camera views a first zone rearwardly of said one side of the vehicle, for display at said first screen portion 202, and during second time intervals the camera views a second zone rearwardly and sidewardly spaced from said one side of the vehicle. FIG. 11 shows that the camera resultant output signal is effectively divided, signal 224 corresponding to scanning of zone 206, and signal 225 corresponding to scanning of zone 207. Signals 224 and 225 are respectively fed to the two screen portions. Very fast "swiveling" electronically, can provide for simultaneous viewing on both screens 202 and 205.

Figure 12:
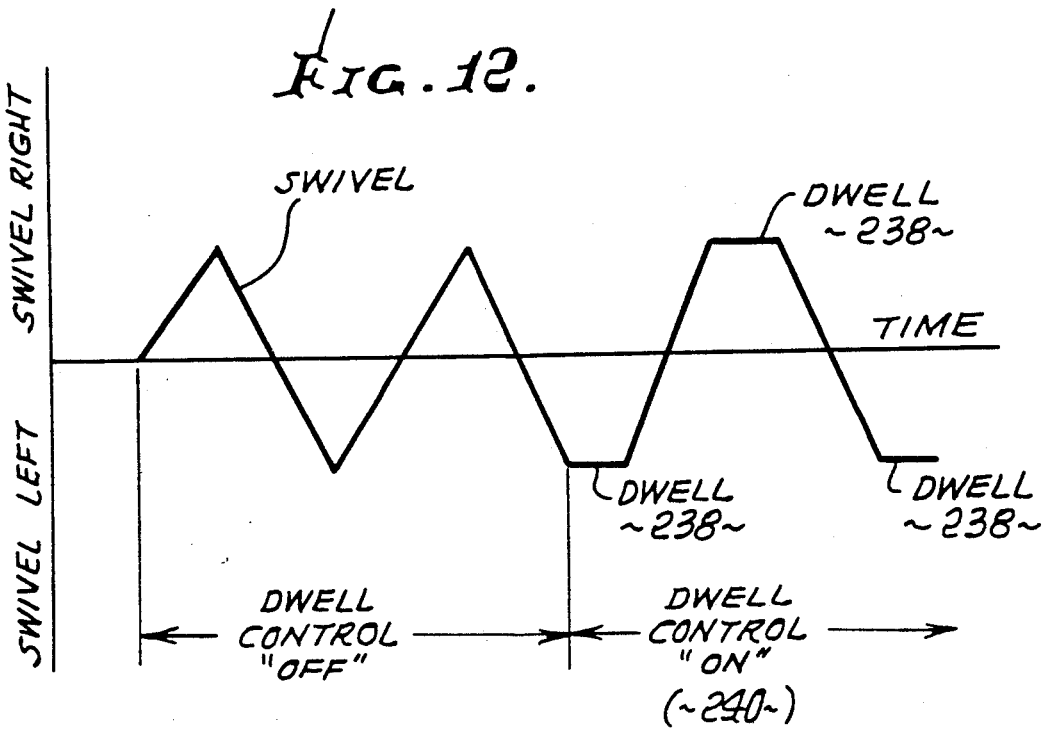
FIG. 12 is a timing diagram.

FIG. 11 refers to an example of means for effecting swiveling of the camera means, and for stopping camera swiveling during a dwell interval, Note dwell selector 230 on the CRT chassis 231. When "ON", the camera is in swivel-swell mode, i.e. the selector causes the control 232 to control the drive 233 to swivel the camera 234 but also to dwell, at its extremes of swivel, for better viewing (eye accommodation) to zones 207 and 206, for example. See also the timing diagram of FIG. 12, showing dwell intervals 238. See also electrical connections at 236-238. Either or both of cameras 200, and 204, and/or 209 and 210 can be caused to swivel and dwell, in this manner, and relatively and independently. The outer camera can be controlled, rearwardly for example, to change its viewing zone as during vehicle turning, and returned to initial position as vehicle completes its turn.

An indicator, such as a light 240, on the CRT means, may be lighted by the control means 232, or other control, during the dwell mode of operation (see 200), characterized by dwell interval, or intervals 238. That light in particular remains "ON" during the swivel stopped condition of the camera. Circuitry 232 may provide automatic stopping of the camera or cameras during a predetermined dwell interval. Likewise, circuit 232 may include a microprocessor to effect onset of dwell when the camera is directed toward a blind spot, relative to the driver. Block 232 may also be considered to represent a manual control operatively associated with the CRT, for stopping camera swiveling at a selected angular portion, for an extended dwell interval i.e. until the manual control is later operated to return the camera to automatic swiveling.

Figure 13:
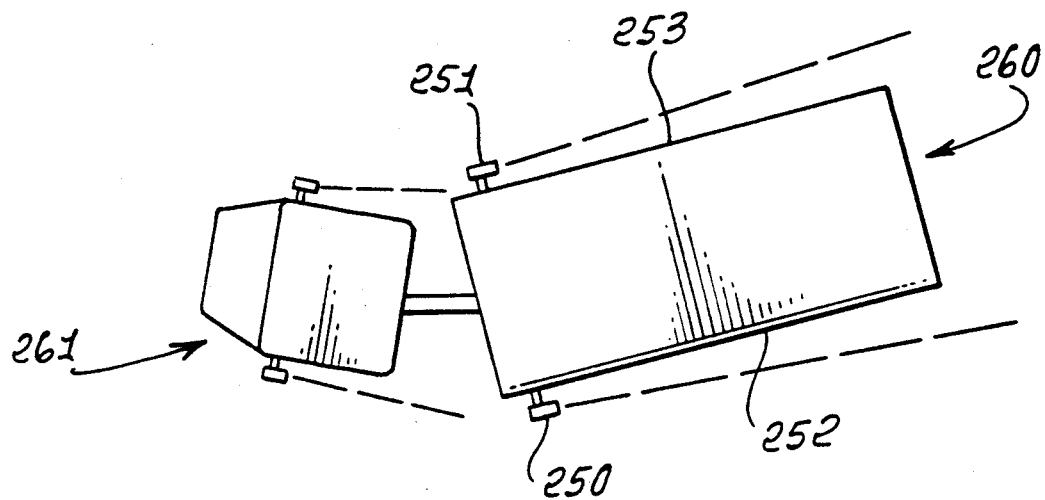
FIG. 13 is a view of tractor-trailer, with enhancement video scanner means on the trailer.
Figure 14:
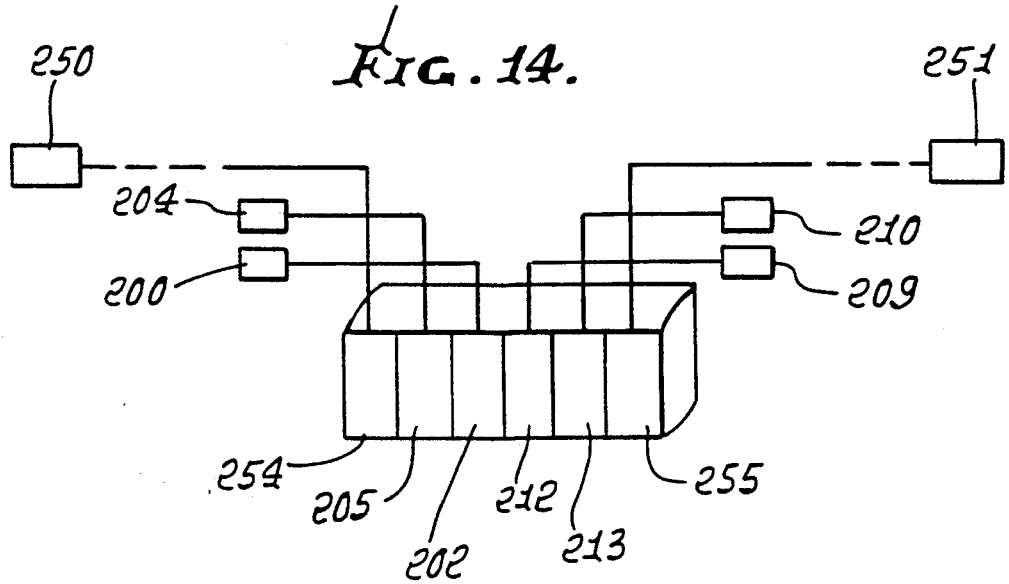
FIG. 14 is a circuit diagram.

Finally, and as seen in FIG. 13, enhancement means is provided in the form of additional video camera means on a trailer unit 260, and operatively connected to said CRT means which is on a tractor unit 261 to be viewed by the driver, the additional video camera means directed toward the rear and side of the trailer, to enable the driver to see on the CRT means roadway conditions to the rear and side of the trailer as well as to the rear and side of the tractor. See for example the video cameras 250 and 251 at the upper forward portions of the trailer opposite sides 252 and 253, to scan rearwardly of the trailer, and to supply view signals to the added CRT screens 254 and 255 (see FIG. 14). This is especially useful during driver controlled jack-knife back-up of the tractor trailer, when the driver cannot see what is to the rear of the trailer.

Swiveling and dwelling in up-down modes can also be employed, and the means to do so may be considered as embodied in the described drivers. Also, a single CRT can be used, with multiple screen sections, as required.

The above enhancement means are particularly valuable and useful when a vehicle is turning a corner as at an intersection.

Indicators can be employed in association with the different screen sections, to indicate to the viewer, for example
left outer zone
left inner zone
right inner zone
right outer zone.
Such indicators may be lights, or other visual means—for example written indicators.

Dwell times of the camera or cameras can be adjusted and/or pre-set to suit the driver's needs—as for example turn-time lengths. Circuitry referred to can incorporate such adjustment or pre-setting.

Wide-angle cameras can be used to reduce need for multi-cameras.

We claim:

1. In apparatus to permit viewing of traffic or other conditions to the rear and side of a motor vehicle having opposite sides, and including
    a) video camera means mounted to the vehicle and directed sidewardly relative to the vehicle, and CRT means operatively connected to the camera means to display the camera means output on CRT screen means, to be viewed by the driver, the improvement, in combination with said apparatus, comprising:
    b) means for effecting swiveling of said camera means, and
    c) enhancement means associated with said video camera means to enhance viewing thereof to the rear and side of the vehicle, said enhancement means including
        i) dwell circuitry connected with said swiveling means to automatically effect stopping of said camera means swiveling during a predetermined dwell interval.

2. The combination of claim 1 wherein said video camera means includes a first video camera at one side of the vehicle and operatively connected with a first screen portion of said CRT means, and said enhancement means comprising a second video camera means at said one side of the vehicle, and operatively connected with a second screen portion of said CRT means, said first and second video cameras directed to view different zones at the side and rear of the vehicle relative to said one side of the vehicle.

3. The combination of claim 2 wherein the first video camera is directed in a first direction to view a first zone rearwardly of said one side of the vehicle, and the second video camera is directed in a second direction to view a second zone rearwardly and sidewardly spaced from said one side of the vehicle.

4. The combination of claim 1 wherein said video camera means includes a first video camera at one side of the vehicle, and operatively connected with first and second screen portions of the CRT means, said enhancement means comprising viewing control means associated with the first camera whereby during first time intervals the first camera views a first zone rearwardly of said one side of the vehicle, for display at said first screen portion, and during second time intervals the first camera views a second zone rearwardly and sidewardly spaced from said one side of the vehicle.

5. The combination of claim 1 wherein said enhancement means includes:
    i) a manually selectable dwell selector associated with said CRT means, and
    ii) control means connected with said dwell selector and with said means for effecting swiveling of said camera means, for stopping said camera swiveling during a dwell interval.

6. The combination of claim 5 including indicator means associated with said CRT means and operatively connected with said control means, for indicating to the driver the swivel stopped condition of the camera means.

7. The combination of claim 6 wherein said indicator means comprises a visual ON-OFF indicator element proximate said CRT means, and which remains "ON" during said swivel stopped condition of the camera means.

8. The combination of claim 1 wherein said dwell circuitry includes microprocessor means to effect said dwell when the video camera means is directed toward a zone of interest, relative to the driver.

9. The combination of claim 1 wherein said vehicle comprises a tractor-trailer, and said enhancement means comprises additional video camera means on said trailer operatively connected to said CRT means which is in said tractor to be viewed by the driver, said additional video camera means directed toward the rear and side of the trailer to enable the driver to see on said CRT means roadway conditions to the rear and side of the trailer as well as to the rear and side of the tractor.

10. In apparatus to permit viewing of traffic or other conditions to the rear and side of a motor vehicle having opposite sides, and including
    a) video camera means mounted to the vehicle and directed sidewardly relative to the vehicle, and CRT means operatively connected to the camera means to display the camera means output on CRT screen means, to be viewed by the driver, the improvement, in combination with said apparatus, comprising:
    b) enhancement means associated with said video camera means to enhance viewing thereof to the rear and side of the vehicle,
    c) said enhancement means including means for effecting swiveling of said camera means, and
    d) a manually operable control associated with the CRT means for stopping swiveling of the camera means at a selected position.

11. The combination of claim 1 wherein said video camera means is carried by the vehicle to be located at one side thereof.

* * * * *